F. VANCURA.
CLOTHES LINE CONNECTOR.
APPLICATION FILED MAR. 3, 1915.
1,164,559.
Patented Dec. 14, 1915.
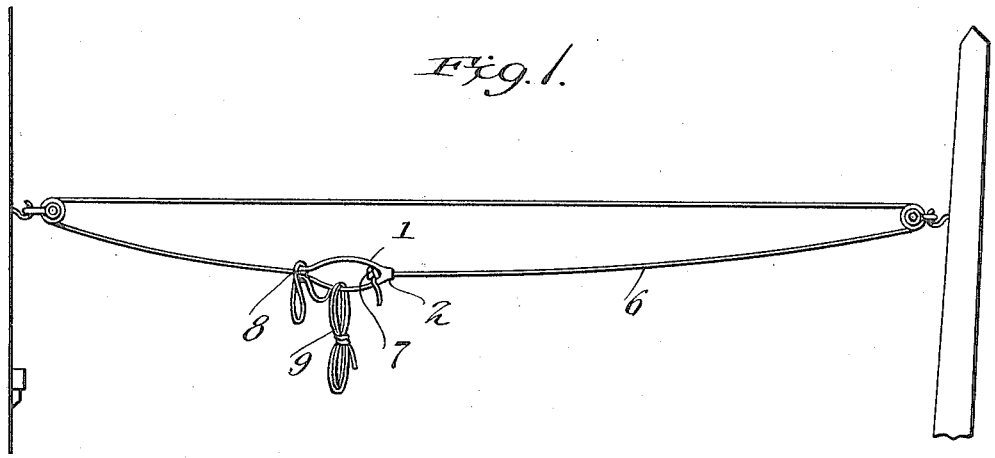
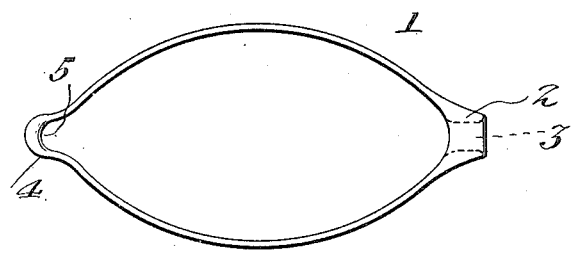
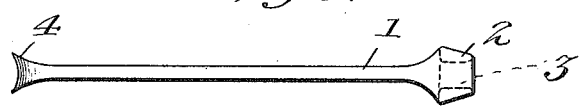
Inventor
Frank Vancura,
By Victor J. Evans
Attorney
Witnesses
M. E. Laughlin
M. L. Toft

UNITED STATES PATENT OFFICE.

FRANK VANCURA, OF LONG ISLAND CITY, NEW YORK.

CLOTHES-LINE CONNECTOR.

1,164,559.  Specification of Letters Patent.  Patented Dec. 14, 1915.

Application filed March 3, 1915. Serial No. 11,886.

*To all whom it may concern:*

Be it known that I, FRANK VANCURA, a citizen of the United States, residing at Long Island City, in the county of Queens and State of New York, have invented new and useful Improvements in Clothes-Line Connectors, of which the following is a specification.

This invention relates to clothes line connectors and it consists in the novel features hereinafter described and claimed.

An object of the invention is to provide a connector of simple and durable structure adapted to be applied to an end and an intermediate portion of a clothes line for connecting the same together, the parts being so arranged that the intermediate portion of the line may be readily detached from the connector when it is desired to lengthen or shorten the line.

With the above object in view the connector is in the form of an elliptical member provided at one end with an aperture through which the line may be threaded and having at its other end a notch in which te intermediate portion of the line may be lodged when the line is tied in position upon the connector.

In the accompanying drawing:—Figure 1 is a side elevation showing the connector applied. Fig. 2 is a side elevation of the connector detached. Fig. 3 is an edge elevation of the same.

The connector includes an elliptical member 1 open at its center and provided at one end with an outstanding boss 2 having an aperture 3 passing through the same the said aperture being in alinement with the longer axis of the member 1. The member 1 is provided at that end opposite the end at which the boss 2 is located with an outstanding portion 4 which is notched at its inner side as at 5. The portion 4 is slightly flat at its intermediate part as most clearly indicated in Fig. 3 of the drawing.

In operation the line 6 is passed through the aperture 3 and the said line is provided at its end with a knot 7 which is adapted to lodge against the end of the member 1 at the inner end of the boss 2 and within the central opening of the member 1 as best shown in Fig. 1 of the drawing. A line 6 may then be passed over suitable pulleys or other supports as indicated in Fig. 1 and the intermediate portion of the line is carried through the member 1 and is then lodged in the notch 5 of the portion 4 thereof. The line 6 is then tied as at 8 (see Fig. 1) about the portion 4 of the member 1 and the free end part of the line may be loose as at 9 and passed through the intermediate portion of the member 1 and supported thereby as shown in Fig. 1.

By such an arrangement it is not necessary to tie hard knots in the line 6 in order to secure the same for the reason that when the intermediate portion of the said line is passed through the portion 4 of the member 1 the sides of the notch 5 grip the opposite sides of the line and tend to hold the line against longitudinal movement therefore it is necessary to tie a loose knot only at 8 in order to restrain the line against longitudinal movement. For this reason it is easy to untie the line when it is desired to lengthen or shorten the same.

Having described the invention what is claimed is:—

A line connector comprising an oblong elliptical member open at its center and provided at one end with an outstanding boss having an aperture and at its other end with a notch adapted to receive the line, said notch and the aperture through the boss being in alinement with each other and in alinement with the longer axis of the member.

In testimony whereof I affix my signature in presence of two witnesses.

FRANK VANCURA.

Witnesses:
 EDWARD J. MAHER,
 WILLIAM VANCURA.

Copies of this patent may be obtained for five cents each, by addressing the "Commissioner of Patents, Washington, D. C."